United States Patent [19]
von Kaler

[11] Patent Number: 5,063,794
[45] Date of Patent: Nov. 12, 1991

[54] SHIFT KEY HAVING SHOULDER

[75] Inventor: Roland L. von Kaler, Tecumseh

[73] Assignee: Tecumseh Products Company, Tecumseh, Mich.

[21] Appl. No.: 694,216

[22] Filed: Apr. 19, 1991

[51] Int. Cl.⁵ .............................................. F16H 3/08
[52] U.S. Cl. ........................................ 74/371; 74/372
[58] Field of Search ............... 74/366, 371, 372, 377, 74/376, 369, 378; 192/71

[56] References Cited

U.S. PATENT DOCUMENTS

| | | | |
|---|---|---|---|
| 3,028,763 | 4/1962 | Vetsch | 74/371 |
| 4,656,886 | 4/1987 | Edwards | 74/475 |
| 4,662,241 | 5/1987 | Edwards | 74/701 |
| 4,702,119 | 10/1990 | Edwards | 74/371 |
| 4,702,120 | 10/1987 | Okada et al. | 74/371 |
| 4,779,475 | 10/1988 | Irikura et al. | 74/371 |
| 4,809,560 | 3/1989 | Nemoto | 74/371 |
| 4,827,783 | 5/1989 | Yamaoka et al. | 74/477 |
| 4,841,794 | 6/1989 | Hikishima | 74/371 |
| 4,858,739 | 8/1989 | Nemoto | 192/18 |
| 4,907,466 | 3/1990 | Kuhn | 74/378 |

Primary Examiner—Dwight Diehl
Attorney, Agent, or Firm—Jeffers, Hoffman & Niewyk

[57] ABSTRACT

The present invention is an improved key for an in-line transmission. The key is located within a channel in the shift shaft and selectively engages keyways of gears disposed about the shift shaft. A shift fork and collar axially move the key within the shift shaft by engaging and moving the base of the key. The key includes a shoulder which connects the head and the shank portion of the key, with the shoulder being thicker than the shank to cause more of the key to be supported within the shift shaft channel and thereby the key is better able to withstand the shearing forces which result from the rotational coupling of the shift shaft and the gears. The shoulder includes the portion of the key which extends out of the channel to the keyway and connects with the head, and which also faces the same direction as the head.

5 Claims, 2 Drawing Sheets

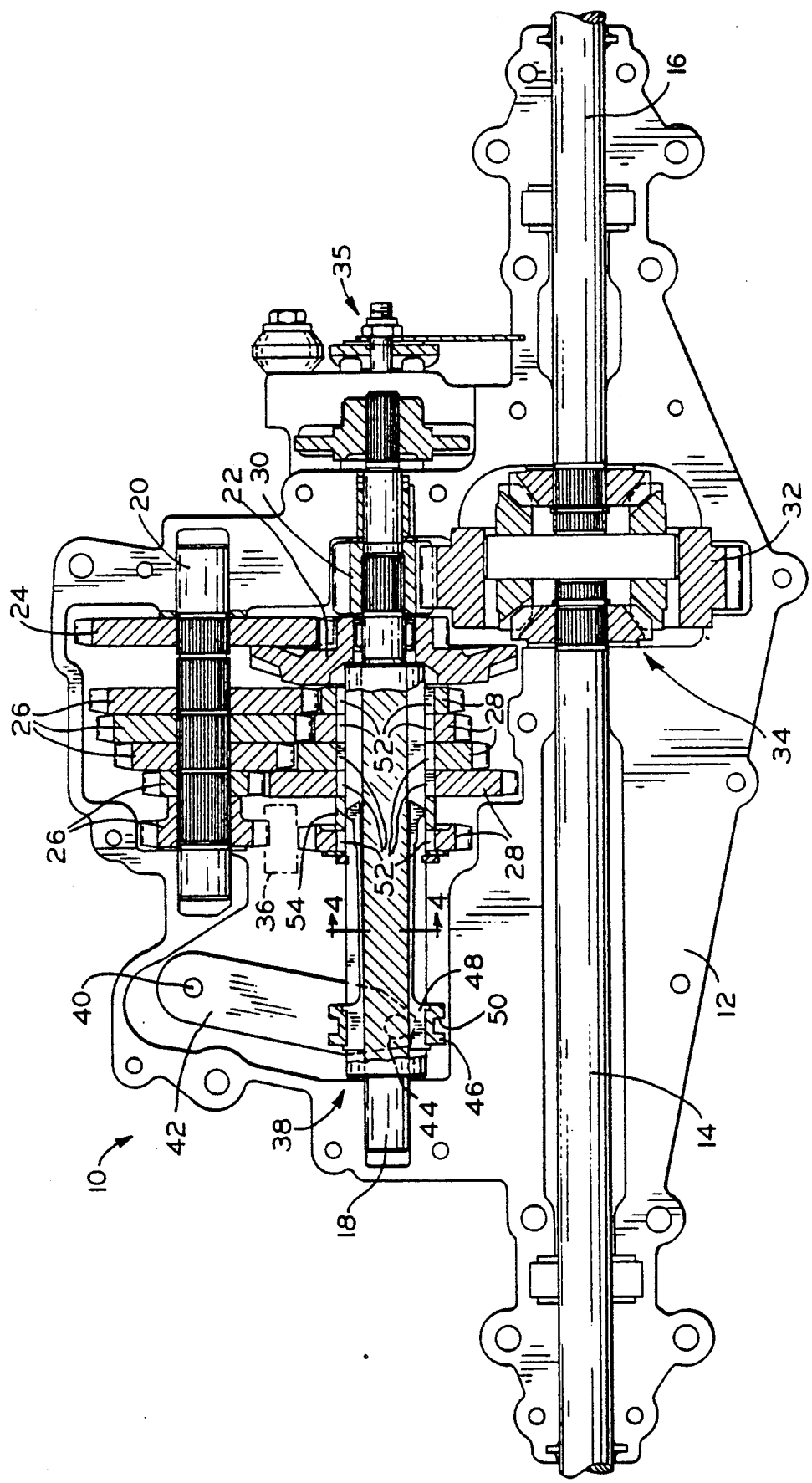
FIG_1

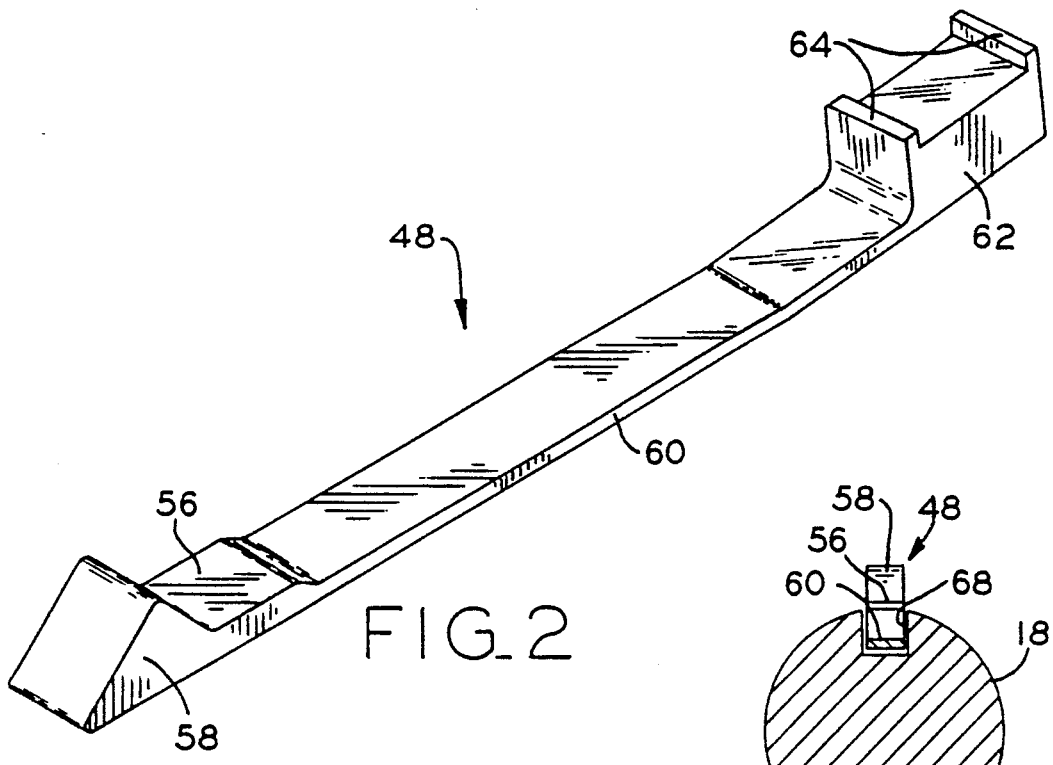
FIG_2
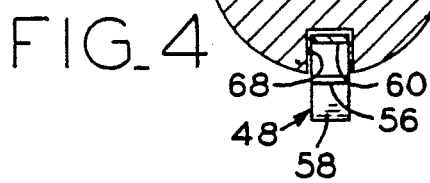
FIG_4
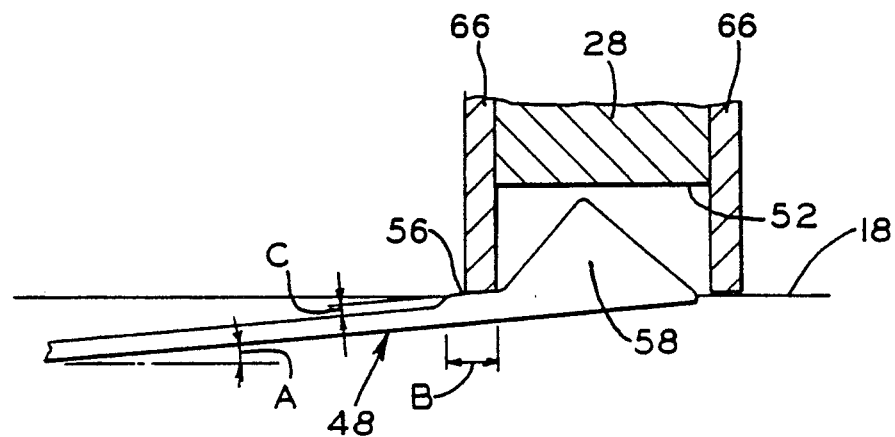
FIG_3

SHIFT KEY HAVING SHOULDER

BACKGROUND OF THE INVENTION

1. Field of the Invention

The present invention relates to in-line shift transmissions. More specifically, the field of the invention is that of shift keys for in-line shift transmissions.

2. Prior Art

In-line shift transmissions include a plurality of linked transmission shafts, with one of the shafts being a shift shaft supporting a plurality of rotatable gears. Disposed axially within the shift shaft are keys which can engage internal keyways of the gears and thereby rotatably connect the engaged gear to the output shaft. The key comprises a resilient metal having an elongate shaft and a head portion which is biased to extend into the gear keyway.

An in-line transmission is disclosed in U.S. Pat. No. 4,996,574, assigned to assignee of the present invention, the disclosure of which is explicitly incorporated by reference. The shifting mechanism of the '574 transmission includes a pair of axially movable shift keys disposed in longitudinal channels of the shift shaft. The shift keys rotatably couple the shift shaft with one of the gears. Each key has a base portion engaging a shift collar which is axially slidable on the shift shaft. The collar has a peripheral groove receiving a pin of a shift fork. The shift fork can pivot within the housing and is connected to the shifting mechanism of the vehicle.

The shift fork, pin, and annular groove permit the collar, and hence the keys, to be moved axially while the keys are at the same time rotating with the shift shaft. Each of the gears journalled on the shift shaft has on its inner circumference four circumferentially spaced keyways which may be engaged by the keys to rotatably couple the shift shaft with the selected gear. The keys have triangular key heads and flexible spring shank portions which spring bias the key heads radially outward and into the keyways. Most of the key shaft is rotatably supported by the channel of the shift shaft, and most of the key head rotatably engages the sides of the gear slot. Thus, while the keys are radially resilient they are also rotatably rigid.

Between each adjacent gear on the shift shaft are annular washers which separate adjacent keyways and which, acting on the triangular sides of the key heads, force the heads out of each keyway upon axial movement of the collar and keys. Consequently, as the keys are moved axially by the shift collar, the key heads successively engage and disengage the keyways of adjacent gears, thereby coupling each gear to the shift shaft sequentially one at a time.

One problem encountered by in-line shift transmissions involves shearing forces on the keys when they are engaged with a keyway. Most of the key head extends into the keyway so that the connecting portion between the triangular key head and the key shaft receives all the twisting and shearing force of the load. When high shearing forces are applied to a shift key, a connection failure between the key head and keyway may occur, or the key may break. Some prior art transmissions limit shearing forces on the keys by increasing the diameter of the shift shaft, because the amount of shearing force which acts on the connecting portion of the keys decreases as the diameter of the shift shaft increases. However, the increased diameter of the shift shaft limits the possible range of gear ratios. Therefore, providing a large range of gear ratios and a smaller transmission size runs against known methods of reducing stress on the shift keys.

What is needed is a transmission shift key arrangement which provides a compact transmission having a large range of gear ratios.

Also needed is a transmission which reduces the stress applied to the shift keys.

Additionally needed is a shift key which can better withstand shearing forces from the shift shaft.

A further need is for an improved shift key which is compatible with existing transmission designs.

SUMMARY OF THE INVENTION

The present invention is an improved shift key which better withstands shearing forces. The shift key includes a shoulder which connects the key shank portion and the key head. The shoulder is thicker than the key shank and is located so that it abuts the washer defining the keyway in which the key head is disposed, and that thickness makes the key head better able to absorb the stress while not significantly impairing the operation of the shifting mechanism.

Although thickening the key shank generally reduces the spring resiliency, only a critical portion of the key shank is thickened while most of the key shank has the thickness of a conventional key shank to retain sufficient resiliency and maintain proper operation. Further, the key head is better supported in the shift shaft to more securely engage the keyways, and the angle at which the key is disposed is lessened to lessen the shearing forces acting on it. Therefore, the key of the present invention functions as well as prior art keys in terms of the spring resiliency of the key shank.

The improved key does not extend as far into the keyway because the thickened shoulder abuts a wall of the keyway, thus increasing the portion of the key head supported by the channel of the shift shaft. Only a relatively small portion of the key shank portion is thickened, namely the shoulder which is between the key head and the portion of the elongate key shank disposed within the channel of the shift shaft. The shoulder, and perhaps a small portion of the shank, are the only portions of the key which are not supported by either of the shift shaft or the keyway, so that thickening at the shoulder contributes greatly to the rotational strength of the key while not significantly detracting from its radial resiliency.

The improved key construction is compatible with many in-line transmission designs. The interconnections necessary to operate the improved key are identical to those necessary for the prior art key. Therefore, existing transmissions may utilize the improved key simply by replacing keys. This eliminates the expense of altering existing transmissions and changing the tooling on the production lines of new transmissions. Also, the change in tooling necessary to produce the improved key is minimal and thus further minimizes the cost.

The present invention, in one form, is a transmission comprising a housing, a plurality of shafts, a key, and a shifting device. The shafts are rotatably disposed within the housing, one of the shafts being a shift shaft with a plurality of gears thereon, each gear having a keyway. The key is disposed within the shift shaft, and includes a head portion and an elongated shank portion. The key is radially outwardly biased so that the head portion engages one of the keyways. The shifting device moves the key within the shift shaft and selectively engages the key head with the gear keyways. The transmission further includes means for limiting movement of the key into the keyways to lessen the effects of shearing forces on the key during rotation of the shift shaft.

One object of the present invention is to provide a transmission shift key arrangement which provides a compact transmission with a large range of gear ratios.

An additional object is to provide a transmission which reduces the stress applied to the shift keys.

Also an object is to provide a shift key which can better withstand the shearing forces from the shift shaft.

A further object is to provide an improved shift key which is compatible with existing transmission designs.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a top view, in partial cross-section, of an in-line transmission having the shift key of the present invention.

FIG. 2 is a perspective view of the shift key of the present invention.

FIG. 3 is sectional view of the shift key engaging a gear keyway.

FIG. 4 is a sectional view taken along view lines 4—4 of FIG. 1.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

The present invention relates to in-line shift transmission 10 as shown in FIG. 1. Lower housing 12 together with an upper housing (not shown) rotatably supports axles 14 and 16, shift shaft 18, and counter shaft 20. An input shaft (not shown) turns input bevel gear 22 which is freely rotatable about shift shaft 18 and engaged with gear 24 of counter shaft 20. Companion gears 26 of counter shaft 20 engage spur gears 28 of shift shaft 18 so that gear 30 of shift shaft 18 drives ring gear 32 of differential 34 and thereby turns axles 14 and 16 in a forward direction. In addition, transmission 10 may be slowed or stopped by operation of brake assembly 35. A reverse gear may be provided by stub shaft and gear 36 being disposed between one of companion gears 26 and one of spur gears 28.

The gear ratio of transmission 10 is determined by shifting mechanism 38 which includes shift input shaft 40, shift fork 42, pin 44, collar 46, and keys 48. Shift input shaft 40 is connected in a known manner to linkage (not shown) of the vehicle which allows the vehicle operator to change gears manually. Shift fork 42 is pivotally connected with shift input shaft 40 and includes pin 44 which extends into annular groove 50 of collar 46. Collar 46 which is located on shift shaft 18 and operably engages keys 48. Keys 48 are disposed within shift shaft 18 and selectively engage gear keyways 52 which are formed by internal recesses in spur gears 28 to provide forward and reverse gear ratios. Neutral sleeve 54 provides an axial position within shift shaft 18 wherein keys 48 do not engage any keyway 52. Alternatively, neutral sleeve 54 may include an internal recess to form an additional recess providing an engagable neutral position.

In accordance with the present invention, key 48 includes shoulder portion 56 which connects triangularly shaped key head 58 and elongated key shank portion 60 (see FIG. 2). Key shank 60 has an inherent resiliency which biases key head 58 radially outwardly and into keyways 52. Also, key shank 60 extends from base portion 62 which includes flanges 64 for engaging collar 46. As shown in FIG. 3, washers 66 and gear 28 define keyway 52, although washers 66 could be eliminated and a shoulder (not shown) could be formed integrally with gears 28. Shoulder 56 abuts washer 66 when key head 58 engages keyway 52 to limit the angle A at which key shank 60 is disposed relative to the axis of shift shaft 18. The smaller angle A is, the more of key 48 is contained and supported within channel 68 of shift shaft 18 (see FIG. 4). This lessens the amount of shearing force which acts on key shank 60 during rotational engagement with shift shaft 18.

In the preferred embodiment, substantially all of key 48 is received in channel 68 of shift shaft 18, including a significant portion of key head 58 (see FIG. 3). Shoulder 56 is thickened, having a greater thickness than key shank 60, and extends from the side of key 48 which faces gears 28. Key shank 60 is supported by the walls of shift shaft 18 which define channel 68, so that little or no shearing force acts on the thinner key shank 60. Key head 58 preferably has a triangular body which abuts the internal recess defining keyway 52 of one of gears 28 to couple shift shaft 18 rotatably to the selected gear 28. The thickened portion of shoulder 56 also limits the extension of key head 58 into keyway 52, thereby causing more of key head 58 to be supported by channel 68. Shearing forces are most damaging in interval B because key 48 is not supported by any other structure, and because gears 28 act as resistance to the rotation of keys 48, shoulder 56 is further stressed. Thus thickened shoulder 56 helps to reduce the wear on keys 48 by both limiting the angle at which the keys extend into keyways 52, and by reinforcing the portion of key 48 which is most subject to stress by the rotation of shift shaft 18.

Keys 48 are formed conventionally with the modification of the additional thickened portion of shoulder 56. The exact dimensions of shoulder 56 are relative to the size of shift shaft 18, the dimensions of key 48, and the dimensions of the internal recess of gear 18 which defines keyway 52. In the exemplary embodiment, the thinner key shank 60 has a thickness of about 0.050 inches while the thicker shoulder 56 has a thickness of about 0.062 inches. The difference in thickness between key shank 60 and shoulder 56, shown as C in FIG. 3, provides the aforementioned improvement to the shift key of the prior art. Also, shoulder 56 extends a length of about 0.125 inches between shank 60 and key head 58.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transmission comprising:
   a housing;
   a plurality of shafts rotatably disposed within said housing, one of said shafts being a shift shaft with a plurality of gears, said shift shaft including an axial channel, each of said gears having a keyway;
   a key disposed within said axial channel of said shift shaft, said key including a head portion, an elongated shank portion, and means for radially outwardly biasing said head portion into engagement with one of said keyways;
   shifting means for moving said key within said shift shaft and selectively engaging said key head with said keyways; and
   means for limiting movement of said key into said keyways, said means for limiting movement comprising a shoulder portion of said key located intermediate said key shank portion and said key head portion, said shoulder portion being thicker in a radial direction than said key shank portion.

2. The transmission of claim 1 wherein said shoulder portion extends from said key shank portion in the same direction that said key head extends whereby the angle, relative to the axis of said shift shaft, at which said key engages said keyways is limited.

3. The transmission of claim 1 wherein said shifting means includes a shift fork operably connected to said housing and a collar disposed on said shift shaft.

4. The transmission of claim 3 wherein said key includes a base portion engaging said collar.

5. The transmission of claim 1 wherein said shoulder portion is about 0.012 inches thicker than said shank portion.

* * * * *